United States Patent
Berger et al.

[15] 3,663,373
[45] May 16, 1972

[54] PROCESS FOR THE PREPARATION OF IODININ

[72] Inventors: Julius Berger, Passaic; Richard H. Epps; Edward M. Jenkins, both of Montclair; Benjamin Tabenkin, Upper Montclair, all of N.J.

[73] Assignee: Hoffman-La Roche Inc., Nutley, N.J.

[22] Filed: Feb. 24, 1970

[21] Appl. No.: 13,785

[52] U.S. Cl. .............................. 195/96, 195/100
[51] Int. Cl. .................................... C12d 9/00
[58] Field of Search ........................ 195/96, 100

[56] References Cited

UNITED STATES PATENTS 2,666,017  1/1954  Moss et al. .............................. 195/100
3,142,628  7/1964  Phillips .............................. 195/100 X

OTHER PUBLICATIONS

Gerber et al., Biochemistry, Vol. 3, No. 4 (1964), pages 598–602
Gerber et al., Biochemistry, Vol. 4, No. 1 (1965), pages 176–180
Podojil et al., Biochemistry Vol. 6, No. 9 (1967), pages 2701–2705
Difco Manual, Ninth Ed. Difco Laboratories Inc. Detroit, Mich., pages 255–265

*Primary Examiner*—Joseph M. Golian
*Attorney*—Samuel L. Welt, Jon S. Saxe, Bernard S. Leon and William G. Isgro

[57] ABSTRACT

A method for producing iodinin through the cultivation of selected isolates of the organism *Brevibacterium iodinum*. Cultivation takes place in a specialized nutrient medium and the iodinin is isolated by extraction. Iodinin is a valuable chemical intermediate used in the preparation of the known pharmaceutically useful antibiotic myxin.

9 Claims, No Drawings

PROCESS FOR THE PREPARATION OF IODININ

BACKGROUND OF THE INVENTION

In recent years iodinin (1,6-phenazinediol 5,10-dioxide) has been found to be one of about twenty phenazine compounds known to be produced by microorganisms. Recent developments in the antibiotic field have made iodinin of particular interest since it can be converted to the new and pharmaceutically valuable antibiotic, myxin. Myxin is also produced by the fermentation of a particular species of *Sorangium*. This last-mentioned fermentation procedure, however, suffers from the defect of achieving the desired end in low yields. Thus, it should be apparent that a procedure for the preparation of iodinin which results in good yields utilizing readily available starting materials would be of substantial benefit to the art.

The development of synthetic pathways to myxin utilizing iodinin as the starting material constituted a substantial step toward providing the valuable antibiotic myxin in yields suitable from a commercial point of view. However, the unavailability of large quantities of iodinin hampered the commercial development of the last-mentioned synthetic route. Thus, there remains the necessity of finding an efficient method of producing the primary reactant, iodinin, in yields that are sufficiently pure and of adequate size to satisfy the requirements of commercial production techniques for myxin.

It is the object of the present invention to provide a method of preparing iodinin that results in a sufficiently pure product in yields that are adequate to meet the requirements for commercial production of myxin.

In the past, two basic approaches have been followed for the preparation of iodinin. However, in each case, along with the inherent technical problems, the process has shown itself to be grossly insufficient in that the yields, although adequate for experimental purposes, have been far too low for commercial purposes. The first of these approaches involves a chemical synthesis wherein iodinin is prepared by the oxidation of 1,6-dihydroxyphenazine. The effectiveness of this synthesis is, however, impaired by the difficulty in protecting the hydroxyl groups and by the poor solubility of the reaction materials. In the second of these approaches, a variety of fermentation procedures has been employed in an attempt to develop an efficient method for iodinin production. These procedures have used the several microorganisms found to produce iodinin, namely, *Brevibacterium iodinum*, *Microbispora aerata* and *Streptomyces thioluteus*, and for their growth have used various growth media and fermentation conditions. In most cases the nutrient media contained about 1 percent Difco Bacto yeast and about 1 percent glucose. In each case the fermentation process was time consuming (about 2 weeks), the growth medium was quite expensive for large scale use, and the yields were far too low for commercial purposes (i.e., less than 0.2 g/liter).

Because of the known value of myxin and its potential wide scale use, the development of a process for the production of iodinin that is capable of commercial yields is of utmost importance in the antibiotic field. We have now found that by utilizing highly developed microbial strains of the organism *Brevibacterium iodinum* and growing these highly developed strains in specially designed culture media, markedly increased yields of iodinin, sufficient for commercial purposes, can be obtained.

DETAILED DESCRIPTION OF THE INVENTION

The present invention relates to a method of producing iodinin (1,6-phenazinediol 5,10-dioxide). More particularly, the invention relates to a simple and effective method for producing substantial amounts of iodinin through the cultivation of selected isolates of the organism *Brevibacterium iodinum*. The desired end product iodinin has the following structural configuration:

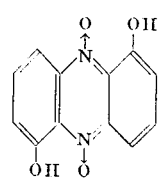

This compound is of particular interest and importance because of its structural similarity to the known pharmaceutically valuable antibiotic myxin and because of the development of a commercially feasible synthetic route from iodinin to myxin.

The microorganism *Brevibacterium iodinum* utilized in the process of the invention was selected after a detailed study from among the several organisms known to produce iodinin because of its superior iodinin producing capacity. The species *Brevibacterium iodinum* described herein includes all strains of the organism which are operable to produce the desired iodinin and which cannot be definitely differentiated from the above-indicated strains and its subcultures including mutants and variants. The present invention further includes the use of mutants produced from the described organism by various means, such as chemical mutagenic agents, ultraviolet radiation, X-radiation, phage exposure and the like. A culture of the organism *Brevibacterium iodinum* is available in the collection of microorganisms in the United States Department of Agriculture, Northern Utilization Research and Development Division, Peoria, Ill., under Registration Number 1536.

For the purposes of the present invention, the fermentation process is conducted utilizing highly developed microbial strains of the organism *Brevibacterium iodinum*. From the parent culture, those strains showing marked ability to produce iodinin are removed and sub-cultured. Sub-culturing is performed periodically so that only microorganisms with a good iodinin producing capacity are utilized in the fermentation procedures.

The selection of the good iodinin producing microorganisms is performed as follows. A culture of the microorganism *Brevibacterium iodinum* is suspended in a sterile enrichment broth. When the microorganisms are growing well in the enrichment broth, a small amount of the broth containing the microbial growth is streaked across enriched nutrient agar plates. The streaking deposits single organisms on the agar which subsequently develop into colonies, each of which represents a relatively pure culture. The colonies which develop a deep purple color represent strains of the microorganism *Brevibacterium iodinum* which exhibit a good iodinin producing capacity. A small portion of the individual colonies showing this deep purple color is then lifted from the agar plate and transferred to a sterile nutrient broth. The microbial growth that develops in this nutrient broth can then be used to inoculate the fermentation broth used for cultivating the microorganism *Brevibacterium iodinum*.

High iodinin producing strains of *Brevibacterium iodinum* may also be obtained by ultraviolet irradiation or chemical treatment of a suspension of bacterial cells. The chemical treatment can be effected using substances such as nitrosoguanidine, nitrogen mustard, sodium nitrite and the like, with nitrosoguanidine being preferred. The survivors from a population in which over 99 percent of the cells have been killed by the irradiation or chemical treatment are then cultivated as described above to prepare the inoculum used in the fermentation.

An important feature of the present invention is the composition of the nutrient medium employed for cultivating the microorganism *Brevibacterium iodinum*. It has been found that certain of the ingredients contained in the nutrient medium are essential for obtaining the desired high yields of iodinin.

The essential ingredients of the nutrient medium include the following:

1. A nitrogen source. The nitrogen source for fermentation media can be selected from a variety of commercially available yeasts and yeast-derived products such as Difco Bacto Yeast Extract and Brewer's Dried Yeast as well as from a variety of complex nitrogenous products derived from packing house wastes, milk products, seed or bean meals and the like.

For the purposes of the present invention, it has been found that a nitrogen source containing a hydrolyzed protein produces the greatest enhancement in iodinin yield. The preferred protein sources include defatted seed or bean meals, such as peanut meal, soybean meal, cottonseed meal and the like, defatted milk products such as dried milk solids or meat or fish protein products. Hydrolysis of these protein sources can be accomplished by treating the protein rich materials with enzymes rich in proteases. Examples of suitable proteolytic enzymes for this purpose include plant proteases (i.e., ficin, bromelin, papain), bacterial protease, fungal protease, pepsin, animal diastase, trypsin and pancreatin, or mixtures thereof. The proteolytic hydrolysis can be accomplished best by mixing the protein source in an aqueous menstruum with the proteolytic enzyme, incubating the mixture to permit digestion of the protein and preparing the resulting digests in a suitable form for adding to the fermentation medium. For example, the digest can be added directly to the medium, or it can first be freeze-dried to solid form and then added. If desired, the protein preparation can first be boiled before addition of the proteolytic enzyme. This boiling helps to denature the protein, aids in reducing microbial contamination during digestion and brings about a partial breakdown in the protease inhibiting material found in certain protein sources.

In addition to the above-described preferred protein sources, there are also available commercially prepared hydrolyzed protein sources. Included among such commercially available products which are suitable for the purposes of the present invention are enzyme hydrolyzed defatted beef muscle (Amber Laboratories, Enzyme Hydrolyzed Meat Protein), enzyme hydrolyzed defatted soy protein Sheffield Chemical Corp., Soy Peptone), hydrolyzed packing house wastes (Wilson laboratories, Proto Peptone 366), corn steep water solids and cottonseed protein hydrolysate. The most preferred of these nitrogen sources is the enzyme hydrolyzed defatted soybean meal.

The nitrogen source is present in from about 0.2 to about 5 percent, preferably from about 2.0 to about 4.0 percent, by weight in the final nutrient medium.

2. A carbohydrate source. The carbohydrate source can be selected from a variety of sugar or starch products including glucose, maltose, sucrose, lactose, blackstrap molasses, invert molasses, corn-potato starch and the like or mixtures thereof. For the purposes of the present invention, it has been found that the most effective carbohydrate sources are glucose, technical grade glucose, blackstrap molasses and invert molasses, with glucose and technical grade glucose being the most preferred ingredients.

The carbohydrate source is present in an amount ranging from about 1 to about 10 percent, preferably from about 2 to about 5 percent, by weight of the final nutrient medium.

3. Trace nutrients. The addition to the nutrient medium of certain amino acids or B vitamins has been found to enhance the iodinin yield considerably. Among the additional trace nutrients that stimulate iodinin production are l-valine, l-leucine, l-lysine, l-methionine, l-tryptophane, l-phenyl-alanine, l-tyrosine, calcium pantothenate and folic acid; with l-valine and l-leucine producing the most prominent yield increases. A mixture of metal ions such as K, Ca, $PO_4$, Mg, Mn, Cu, Co, Zn, Fe, Mo, etc., may be added to the medium to enhance growth and antibiotic production when these ions are not already present in the natural media. The trace nutrients are incorporated into the nutrient medium at a level of from about 0.001 to about 1 gram per liter.

4. Surface-Active Agents. The addition to the fermentation medium of certain surface-active compounds, that is, compounds which alter the surface tension, stimulates iodinin production considerably. Particularly, it has been found that organo-silicone polymeric surface-active agents are the most effective surface-active agents in stimulating the production of iodinin, with non-ionic polyalkylene oxide silane emulsions being the most preferred. The surface-active agents are incorporated into the nutrient medium at a level of from about 0.5 to about 10.0 grams per liter, with the preferred level being about 1.0 to about 5.0 grams per liter.

The initial pH of the fermentation broth must be in the range of from about 5.0 to about 9.0, with an optimum pH during fermentation in the range of 6.5 to 8.5. The pH of the broth is adjusted by the addition of an alkali metal hydroxide, such as sodium hydroxide, or by the addition of a mineral acid such as sulfuric acid.

The fermentation process of the present invention is carried out by culturing one or more strains of *Brevibacterium iodinum* in a nutrient medium as described above at a culture temperature in the range of about 20° C. to about 40° C., preferably from about 25° C. to about 32° C. The fermentation requires agitation and aeration for optimum iodinin yields, but iodinin production still takes place, although slowly, in non-agitated media in contact with atmospheric oxygen. Iodinin production does not occur or is markedly inhibited in the complete absence of atmospheric oxygen. The incubation time ranges from about 2 to about 12 days, preferably from about 4 to 9 days.

The iodinin produced by fermentation may then be recovered utilizing one of several simple recovery procedures. In one such recovery procedure, the broth, with suspended solids, may be extracted directly using a suitable non-reacting organic solvent, such as, for example, methylene chloride or chloroform. Iodinin crystals may be recovered in good yield from the concentrated solvent extract by evaporation of the solvent and removal of the solids by filtration or by centrifugation. In an alternate procedure, which is preferred for the purposes of this invention because it requires use of less solvent, the solids are first removed from the broth by centrifugation. The wet sludge recovered is dehydrated by washing several times with a low molecular weight aliphatic water soluble solvent such as, for example, methanol, ethanol, butanol, isobutanol, acetone or the like. The solvent-wet residue is allowed to dry in air and the dried solids are extracted in a liquid-solid extractor (Soxhlet) with a non-reacting organic solvent such as, for example, chloroform, methylene chloride or toluene.

In a preferred process of the invention, the nutrient medium contains, in grams per liter, about 20 grams of enzyme hydrolyzed defatted soy protein, about 30 grams of technical glucose, from 1–5 grams of non-ionic polyalkylene siloxane emulsion (Union Carbide Corp. preparation SAG 4988), and about 1 gram of l-valine, with the medium being brought up to volume with distilled water. Following preparation of the nutrient medium, the pH is adjusted by the addition of an alkali metal hydroxide such as sodium hydroxide, or by the addition of sulfuric acid within the operable range of 6.0 to 9.0 and the medium is sterilized, for example, at 120° C. for 20–30 minutes. At this point the nutrient medium is ready to be used in the fermentation process as it is described above.

The process of the invention is further illustrated by the following examples.

EXAMPLE 1

Preparation of Stock Cultures

Brevibacterium iodinum strains were maintained on agar slants containing, in grams per liter:

| | |
|---|---|
| Enzyme hydrolyzed defatted soy protein[a] | 20 |
| Technical glucose[b] | 30 |
| Bacteriological agar | 20 |
| Distilled water to volume | |

[a]Sheffield Chemicals Corp., Soy Peptone T-1
[b]Corn Products Corp., Cerelose

The pH was adjusted to 6.8 – 7.2 before sterilization at 120° C. for 20–30 minutes. Inoculated slants were incubated at 28° C. for 2–5 days before use. Stock cultures were refrigerated after 2–3 days incubation.

EXAMPLE 2

Standard Procedure for Shaken Flask Studies

One hundred milliliter portions of the nutrient medium containing the ingredients being screened for their effect on iodinin yield were placed in 500 ml. Erlenmeyer flasks which were closed with loosely fitting cotton plugs and sterilized by autoclaving at 120° C. for 20–30 minutes.

Inoculum for flask studies was prepared by suspending the growth from an appropriate number of replicate slants, prepared as in Example 1, in sterile distilled water, using a ratio of about 10 ml. of water per slant. Each flask was inoculated with 1 ml. of this cell suspension.

During incubation (usually at 28° C.) the flasks were agitated continuously on a New Brunswick Scientific Co. rotary shaker which imparted a circular rotary motion of 1-inch orbit at 240–280 cycles per minute.

For assays, samples of 3–5 ml. were removed aseptically periodically from each flask.

EXAMPLE 3

Standard Procedure for Tank Studies

Slant cultures were made and used as described in Example 1. Seed inoculum was prepared in 500 ml Erlenmeyer flasks containing 100 ml. of medium identical with that used in Example 1 for making slants except for the omission of the agar. After incubating on a rotary shaker for 3–5 days at 28° C., 20 ml. quantities of the developed culture were transferred to 2 liter quantities of the seed inoculum medium prepared in Example 2 for flask studies contained in 6-liter seed flasks fitted at the bottom with tubes for aseptically transferring the contents. After inoculation, the 6-liter seed flasks were incubated on a rotary shaker operating at a speed of 200 oscillations per minute. Incubation was continued for from 3–5 days.

A stainless steel tank fermentor of 400-liter capacity, fitted for agitation, aeration, and temperature control, was charged with 200 liters of medium of the same composition as that used in the seed flasks except that tap water was used instead of distilled water. In addition, 0.025 percent of Dow Corning Silicone A paste was added to control frothing during sterilization.

Sterilization was effected by maintaining tank and contents at 120° C. for from 30–45 minutes, then cooling quickly to incubation temperature.

Inoculation was accomplished by transferring aseptically to the tank the contents of two 6-liter shaken seed flasks.

The agitation rate (shaft speed) was then set at 200–250 RPM, aeration maintained at 5 cfm, while maintaining a constant temperature of 28° C.

Foaming was controlled by the addition, as needed, of a sterile 30 percent aqueous suspension of Dow Corning Silicone Antifoam Emulsion A.

The tank was sampled periodically for analytical and microbiological control.

EXAMPLE 4

Standard Analytical Methods

Broth samples from both flask and tank studies were assayed by the following procedure:

A 2.0 ml. aliquot of well-shaken sample was added to 40 ml. of reagent grade chloroform contained in a glass stoppered 50 ml tube and shaken vigorously. The resulting emulsion was then centrifuged at about 2,000 RPM for 5 minutes to break the emulsion.

A 1.0 ml. aliquot of the clear chloroform layer was pipetted out and diluted appropriately with fresh chloroform. The resulting chloroform solution was read at a wave length setting of 535 m$\mu$ in a Beckman DU spectrophotometer or a Bausch and Lomb Spectronic 20 Colorimeter.

The optical density readings obtained were converted to mcg/ml. of iodinin using a calibration curve or by use of the value Emax 535 = 6,350: M.W.=244.

Analyses of broth were found, by recovery studies, to be accurate to about ± 6 percent. The culture broths of *Brevibacterium iodinum* were found not to contain analytically significant amounts of contaminating phenazines absorbing in the close neighborhood of 535 m$\mu$.

EXAMPLE 5

One hundred grams of ground defatted peanut meal was suspended in 300 ml. of distilled water and the pH was adjusted to 8.5 with 5 N sodium hydroxide. Two grams of commercial bacterial protease (Maxatase), suspended in 40 ml. of distilled water, was stirred in, and after thorough mixing, the mass was brought to 500 ml. with distilled water. After making a final readjustment of the pH to 8.5, the material was placed on an incubator shaker and agitated slowly while maintaining a temperature of 40° C. After an incubation period of 48 hours, a 100 ml aliquot was removed and lyophilized to a free-flowing solid.

An aqueous medium was prepared to contain 2 percent of the lyophilized solids and 3 percent of technical glucose (cerelose). After adjusting the pH of the medium to 7.0, 100 ml. portions were dispensed into 500 ml. Erlenmeyer flasks, autoclaved at 120° C. for 30 minutes and, when cool, were inoculated with a suspension of 3-day old cells of *Brevibacterium iodinum*. After inoculation the flasks were placed on a rotary shaker operating at 280 RPM and incubated at 28° C. for 8 days. Samples taken at this time showed an iodinin production of 1,930 mg per liter.

EXAMPLE 6

One hundred grams of defatted soybean meal (Soyalose 103) was suspended in 400 ml. of distilled water and the pH was adjusted to 5.0 with 5 N sulfuric acid. After pH adjustment, the suspension was boiled for 20 minutes and then cooled. When cool, the suspension was diluted to 450 ml. with distilled water and to it was added 50 ml. of an aqueous suspension containing 2 g of pepsin. After addition of the enzyme, the flask was placed on an incubator shaker, maintained at 40° C. and agitated gently. After 72 hours of incubation, the flask contents were readjusted to pH 7.0 and lyophilized.

An aqueous medium was prepared to contain 2 percent of lyophilized solids and 3 percent of technical glucose (cerelose). The pH was adjusted to 7.0 and 100 ml. aliquots were portioned into 500 ml. Erlenmeyer flasks. After sterilization at 120° C. for 30 minutes, the flasks were inoculated with an aqueous suspension of 3-day old cells of *Brevibacterium iodinum* and allowed to incubate at 28° C. on a rotary shaker operating at 280 RPM. Samples taken after 10 days of incubation showed a production of 1,460 mg/liter of iodinin.

EXAMPLE 7

Cottonseed meal was treated at pH 6.0 for 48 hours with a protease - containing animal diastase as described in Example 5. An aqueous medium was then prepared to contain 2 percent of the lyophilized solids and 3 percent of technical glucose (cerelose). Sterilization and inoculation were performed following the procedures in Example 5. After 7 days of incubation, iodinin had accumulated in the amount of 1,230 mg/liter.

EXAMPLE 8

Defatted dried milk solids were treated as in Example 5 with a bacterial protease at pH 8.5 for 48 hours. An aqueous medium was then prepared using the resulting lyophilized solids as in Example 5. After 8 days of incubation, iodinin had accumulated in the amount of 925 mg/liter.

EXAMPLE 9

Defatted peanut meal was treated with pancreatin at pH 8.5 for 48 hours as described in Example 6. A medium prepared with the lyophilized solids as in Example 6, yielded 1,615 mg/liter of iodinin in 10 days.

EXAMPLE 10

The Influence of Surface Active Agents on Iodinin Production

Brevibacterium iodinum NRRL-1536 strain 1302B, was grown for 3 days at 28° C. on five agar slants containing, in grams per liter, hydrolyzed soybean meal 20, technical glucose 30, agar 20, distilled water to make to 1 liter. The pH was adjusted to 6.8 – 7.2 before sterilization. Growth from the slants was suspended in distilled water, pooled and diluted to 50 ml.

One milliliter aliquots of this cell suspension were transferred to 500 ml Erlenmeyer flasks, each containing 100 ml. of medium comprising, in grams per liter, hydrolyzed soybean meal, 20, and technical glucose, 30. The inoculated flasks varied from each other in the amounts and types of surface active compositions they contained. The list of compositions, their concentrations and the iodinin yields obtained with them are shown in Table 1.

Inspection of Table 1 shows that a yield of 4,100 mg/liter of iodinin was obtained in a fermentation time of 7 days in a medium containing 1 gm/liter of a surface active composition labeled Union Carbide Silicone antifoam L-78. A medium containing 5 gms per liter of Union Carbide polyalkylene siloxane preparation SAG 4988 yielded 4,200 mg per liter. Other nonionic surface active compositions also produced marked but somewhat smaller stimulations of yield.

TABLE 1

Influence of Surface—Active Agents on Yields of Iodinin

| Preparation | Gms/liter used in medium for maximum effect | Mg/liter Iodinin Produced | % Increase Over Control |
| --- | --- | --- | --- |
| Control medium | – | 2500 | – |
| UCO-L-[2] | 1 | 4100 | 61 |
| UCO-L-[2] | 5 | 3900 | 52 |
| UCO-SAG-B471[2] | 1 | 3800 | 48 |
| UCO-SAG-B4988[2] | 5 | 4200 | 67 |
| UCO-SAG-B5440[2] | 1 | 3200 | 24 |
| UCO-SAG-B5441[2] | 1 | 3200 | 27 |
| Stauffer SS-201[3] | 1 | 3900 | 52 |
| Hodag K-57[4] | 5 | 3000* | 43 |
| Hodag K-36[4] | 1 | 2500* | 17 |
| Pluronic L-81[5] | 5 | 3500** | 33 |
| Tween-80[6] | 5 | 2500*** | 16 |
| MYRJ-45[6] | 1.5 | 2800*** | 29 |
| MYRJ-59[6] | 5 | 2700*** | 26 |

[2]Union Carbide Corp
[3]Stauffer Chemical Co.
[4]Hodag Chemical Corp.
[5]Dow Chemical Co.
[6]Atlas Chemical Industries Inc.
*Control in this experiment was 2,090 mg/liter.
**Control in this experiment was 2,360 mg/liter.
***Control in this experiment was 2,140 mg/liter.

EXAMPLE 11

Effect of Temperature on Iodinin Production

The fermentation process followed the procedure as set out in Example 2. Fermentations were conducted in 100 ml. quantities of nutrient medium in 500 ml. Erlenmeyer flasks agitated continuously on a 1-inch circular orbit at 240 RPM. The nutrient medium contained 2 percent hydrolyzed soy protein and 3 percent technical glucose, made up in distilled water and adjusted to pH 6.8–7.2 before sterilization. Flasks were inoculated with 1 percent volume/volume of an aqueous suspension of the growth of one 3-day old slant of *Brevibacterium iodinum* strain 1302B in 10 ml. of sterile distilled water. The temperature of incubation was varied with each fermentation to determine the effect of temperature on the stimulation of iodinin production. The results of these tests are recorded in Table 2.

TABLE 2

Effect of Temperature on Iodinin Production

| Temperature of Incubation °C. | Maximum Iodinin Yield, mg/liter | Age in Days |
| --- | --- | --- |
| 22 | <800 | very slow growth |
| 25 | 2700 | 9 |
| 28 | 2100 | 8 |
| 32 | 2400 | 8 |
| 35 | 1400 | 9 |

An inspection of the data in Table 2 indicates that at incubation temperatures between 25°–32° C., the iodinin yields are the highest.

EXAMPLE 12

Influence of Commercially Available Complex Nitrogenous Nutrients on Yield of Iodinin Fermentations were conducted following the procedures set out in Example 2. The basal media, made up in distilled water, contained 1 percent glucose as technical dextrose. The pH was adjusted before sterilization to 6.8–7.2. A variety of commercially available complex nitrogenous nutrient products were screened for their effect on iodinin production by adding these products to the fermentation media. The results of this screen are shown in Table 3.

An inspection of Table 3 indicates that a variety of nitrogenous nutrient products produce increased iodinin yields, with enzyme hydrolyzed defatted soy protein, cotton seed protein and enzyme hydrolyzed defatted beef muscle producing the best results.

EXAMPLE 13

Influence of Carbohydrate Sources on Yield of Iodinin

Fermentations were conducted following the procedures set out in Example 2. The basal media, made up in distilled water, contained 2 percent hydrolyzed soy protein (soy peptone T-1, Sheffield Chemicals Corp.). The pH was adjusted before sterilization to 6.8-7.2 A variety of commercially available carbohydrate sources were screened for their effect on iodinin production

TABLE 3

Influence of Commercially Available Complex Nitrogenous Nutrients on Yield of Iodinin

| Product | % Used in medium | Maximum yield of Iodinin, mg/liter | Age in days |
| --- | --- | --- | --- |
| Hydrolyzed Soy Protein[2], (Soy peptone T-1) | 2 | 1200 | 4 |
| Peptonized Milk[2, 3] | 2 | 360 | 4 |
| Hydrolyzed Packing House Waste (Proto peptone 366)[4] | 4 | 550 | 4 |
| Corn Steep Water Solids | 2 | 620 | 7 |
| Enzyme Hydrolyzed Defatted Beef Muscle[3, 5] | 2.5 | 2300 | 10 |
| Cotton Seed Protein[3, 5] | 2 | 1400 | 10 |

[2]Sheffield Chemicals Corp.
[3]Medium contained 3% glucose as technical dextrose.
[4]Wilson Laboratories.
[5]Amber Laboratories Enzyme Hydrolyzed Meat Protein.
[6]Amber Laboratories Amber CTPH.

TABLE 4

Influence of Carbohydrate Sources on Yield of Iodinin

| Product | % Used in medium | Iodinin yield in mg/liter | Age in days at maximum yield |
| --- | --- | --- | --- |
| Glucose, C. P. | 2 | 1800 | 8 |
| Technical glucose | 5 | 1800 | 8 |
| Blackstrap molasses | 2 | 1500 | 8 |
| Invert molasses | 2 | 1400 | 8 |
| Potato starch | 1 | 900 | 5 |
| Maltose | 5 | 310 | 5 |
| Corn dextrin (Amidex) | 5 | 200 | 5 |
| Sucrose | 2 | 200 | 5 |
| Soluble starch | 1 | 210 | 5 |
| Lactose | 1 | 190 | 5 | by adding these products to the fermentation media. The results of this screen are shown in Table 4.

An inspection of Table 4 indicates that a variety of carbohydrate products produce increased iodinin yields, with glucose, technical glucose and blackstrap or invert molasses producing the highest yields.

EXAMPLE 14

Stimulating Effects on Iodinin Yield Of Various Amino Acids or B Vitamins

Fermentations were conducted following the procedures set out in Example 2. The basal media contained 2 percent hydrolyzed soy bean meal and 3 percent technical glucose, made up in distilled water and adjusted to pH 6.8–7.2 before sterilization. A variety of amino acids and B vitamins were screened for their effect on iodinin production by adding these products to the fermentation media. The results of this screen are shown in Table 5.

An inspection of Table 5 indicates that several of the amino acids and B vitamins screened produce a significant increase in iodinin yields, with l-valine, l-leucine and calcium pantothenate producing the best results.

EXAMPLE 15

*Brevibacterium iodinum* NRRL 1536 strain 1302B was grown on agar slants as described in Example 1. Seed culture was prepared by transferring a loopful of 3-day old slant growth to a 500 ml. Erlenmeyer flask containing 100

TABLE 5

Stimulating Effects on Iodinin Yield of Various Amino Acids or B Vitamins

| Supplement | Conc. in g/liter | % Stimulation in yield of Iodinin | Fermentation Time in Days |
| --- | --- | --- | --- |
| l-valine | 1 | 80 | 10 |
| l-leucine | 1 | 73 | 10 |
| l-lysine | 0.5 | 42 | 9 |
| l-methionine | 0.5 | 41 | 10 |
| l-tryptophane | 0.5 | 36 | 9 |
| l-phenylalanine | 0.5 | 30 | 9 |
| l-tyrosine | 0.5 | 30 | 9 |
| l-glutamic acid | 0.5 | 16 | 9 |
| calcium pantothenate | 0.025 | 46 | 10 |
| folic acid | 0.010 | 43 | 10 |
| cyanocobalamin | 0.001 | 13 | 10 |
| pyridoxine | 0.01 | 12 | 10 | ml. of medium comprising in grams per liter, soy bean meal hydrolysate, 20; technical glucose, 30; distilled water to make 1 liter. The inoculated flask was placed on a rotary shaker table describing a circular 1-inch orbit and agitated at 280 RPM while maintaining a temperature of 28° C. Incubation was continued for 3 days.

Ten milliliter amounts of this seen culture were transferred to 2 liter amounts of seed medium contained in two 6-liter Erlenmeyer flasks fitted with tubes at the bottom for draining the flasks. These 6-liter seed flasks were incubated for 3 days at 28° C. on a rotary shaker describing 200 oscillations per minute. Their contents were then transferred to a 400-liter stainless steel fermentor fitted for agitation, aeration, and temperature control. The tank contained 200 liters of a sterilized medium made up with tap water, comprising 20 g/liter of soy bean meal hydrolysate and 30 g per liter of technical glucose. The pH was adjusted to 7.2 before sterilization. Fifty grams of Down Corning Silicone Antifoam emulsion A paste were added before sterilization to control frothing.

After inoculation the batch was incubated at 28° C. and aerated at the rate of 5 cubic feet per minute while agitating at a shaft speed of 250 revolutions per minute. After 9 days, the iodinin concentration had reached 1,900 mg per liter.

The batch was harvested by centrifugation in a Sharples Industrial Model centrifuge. The wet sludge recovered (8.65 kg) was slurried with 48 liters of solvent comprising 50 percent ethanol-50 percent isopropanol. The solvent suspension was centrifuged to remove the solids, which were resuspended in 45 liters of fresh solvent mixture. The solids were again removed by centrifugation and the solvent wet sludge was spread out in open trays to dry. The dried solids weighted 1.9 kg. and contained 107 g/kg of iodinin. One-hundred-seventy grams of 97 percent pure iodinin were obtained from the dried crude solids by continuous chloroform extraction in a large Soxhlet extractor for a recovery yield of 84 percent.

We claim:

1. A process for the preparation of iodinin which comprises selecting high iodinin producing strains of the microorganism *Brevibacterium iodinum* by choosing for cultivation those microorganisms which display a deep purple color in colony growth; cultivating said selected high iodinin producing strains under aerobic conditions in a liquid nutrient medium containing from about 0.2 to about 5.0 percent by weight of a complex nitrogenous product selected from the group consisting of hydrolyzed seed meal, hydrolyzed bean meal, hydrolyzed milk products, hydrolyzed meat protein or hydrolyzed fish protein, from about 1.0 to about 10.0 percent by weight of carbohydrate, and from about 0.5 to about 10.0 grams per liter of a surface active agent selected from the group consisting of organo-silicone polymeric surface active agents, until a substantial quantity of iodinin is produced; and separating the iodinin thus formed from the fermentation broth.

2. The process of claim 1 wherein the fermentation is effected at a temperature in the range of from about 20° to about 40° C.

3. The process of claim 1 wherein the fermentation is effected at a pH from about 5.0 to about 9.5.

4. The process of claim 1 wherein the fermentation is effected over a period of from about 2 to about 12 days.

5. The process of claim 1 wherein the complex nitrogenous product is hydrolyzed soybean meal.

6. The process of claim 1 wherein the carbohydrate is glucose.

7. The process of claim 1 wherein the surface active agent is non-ionic polyalkylene oxide silane emulsion.

8. The process of claim 1 wherein the separation of iodinin from the fermentation broth is accomplished by removing the solids from the broth by centrifugation, dehydrating the resulting wet sludge by washing with a low molecular weight aliphatic water soluble alcohol, drying the residue and extracting the iodinin from the separated broth solids with a non-reacting organic solvent.

9. The process of claim 8 wherein said non-reacting organic solvent is selected from the group consisting of chloroform, methylene chloride and toluene.

* * * * *